(12) United States Patent
Toda

(10) Patent No.: US 8,103,170 B2
(45) Date of Patent: Jan. 24, 2012

(54) METHOD FOR OPTICAL TIME DIVISION MULTIPLEX AND APPARATUS THEREOF

(75) Inventor: Hiroyuki Toda, Kyoto (JP)

(73) Assignee: The Doshisha, Kyoto (JP)

( * ) Notice: Subject to any disclaimer, the term of this patent is extended or adjusted under 35 U.S.C. 154(b) by 713 days.

(21) Appl. No.: 12/196,871

(22) Filed: Aug. 22, 2008

(65) Prior Publication Data
US 2009/0226175 A1    Sep. 10, 2009

(30) Foreign Application Priority Data

Mar. 10, 2008  (JP) ................. 2008-059125

(51) Int. Cl.
*H04B 10/06* (2006.01)
*H04J 14/08* (2006.01)

(52) U.S. Cl. .................. 398/161; 398/102; 398/213

(58) Field of Classification Search .......... 398/101–102, 398/161, 201, 212–213
See application file for complete search history.

(56) References Cited

U.S. PATENT DOCUMENTS

2003/0133650 A1 * 7/2003 Hakimi et al. ................ 385/27
2006/0280509 A1 * 12/2006 Tomaru et al. ............... 398/188

FOREIGN PATENT DOCUMENTS

JP  10-228387   8/1998
JP  10-229387   8/1998

* cited by examiner

*Primary Examiner* — Leslie Pascal
(74) *Attorney, Agent, or Firm* — Foley & Lardner LLP

(57) ABSTRACT

The present invention inputs a signal synthesized an optical pulse with a variable-wavelength laser beam different in wavelength from it to a delay unit (S1). The delay unit branches the signal to two optical signals, produces an optical path difference between them to afford a delay, synthesizes them again to generate a multiplexed optical signal, and minutely varies the optical path length of one of them (S2). The present invention measures output variance of the delay unit on a variable-wavelength laser beam resulting from the minute variance (S3), and controls the optical path difference so as to minimize output variance at a position where the output is a maximum or minimum, or is a specific value other than them (S4). This stabilizes a phase difference between adjacent pulses of the multiplexed optical signal outputted from the delay unit (5) with a simple construction in optical time division multiplexing technology.

11 Claims, 3 Drawing Sheets

METHOD FOR OPTICAL TIME DIVISION MULTIPLEX AND APPARATUS THEREOF

BACKGROUND

1. Technical Field

The present invention relates to an optical time division multiplexing circuit, and more particularly to an optical time division multiplexing circuit using a delay interferometer.

2. Related Art

Recently, optical communication technologies are in the limelight as technologies for transmitting a large amount of information at a high speed. Of them, an optical time division multiplexing technology is expected to achieve high-volume and very fast transmission along with wavelength division multiplexing technology.

In optical time division multiplexing technology, an optical time division multiplexing circuit is used. In a conventional optical time division multiplexing circuit, an optical pulse train outputted from a pulse light source is divided into two signals, and the divided signals are respectively inputted to optical modulators for modulation. A specific delay is afforded to one of the modulated optical signals via a delay unit, and then the delayed modulated optical signal is synthesized with the other modulated optical signal to generate a multiplexed optical signal.

In this case, to achieve very fast communication, a phase difference between adjacent pulses must be stabilized by introducing a correct delay into the optical signal. However, since the propagation time of light depends on the influence of environmental temperatures and other factors, it has been difficult to stably introduce a correct delay into an optical signal (for example, refer to JP Patent No. 3508901).

SUMMARY

Therefore, an object of the present invention is to stabilize a phase difference between adjacent optical pulses with a simple construction in optical time division multiplexing technology.

To achieve the above-described object, an embodiment of the present invention is a time division multiplexing method that inputs an optical pulse to a delay unit, divides an input signal into two optical signals, produces an optical path difference between the two divided optical signals to create a delay between the two divided optical signals, and synthesizes the optical signals again to generate a multiplexed optical signal. The method stabilizes a phase difference between adjacent pulses of a multiplexed optical signal by minutely varying the optical path length of one of the two divided optical signals, and controlling the optical path difference between the divided optical signals so as to minimize the variance of output of the delay unit on the variable-wavelength laser beam at a position where the output is a maximum, a minimum, or a specific value other than the maximum or minimum.

When controlling an optical path difference produced in the delay unit at a position where the output of the delay unit on the variable-wavelength laser beam is the maximum, the method controls the optical path difference according to a phase difference φ between adjacent pulses of the multiplexed optical signal obtained by Expression 1 (where n is an integer, $\lambda_p$ is the wavelength of the optical pulse, $\lambda_{cw}$ is the wavelength of the variable-wavelength laser beam, c is light velocity, and ΔT is the interval between adjacent pulses of the multiplexed optical signal (ΔT=ΔL/c, where ΔL is an optical path difference)):

$$\phi = 2\pi c \times \Delta T \times \left(\frac{1}{\lambda_p} - \frac{1}{\lambda_{cw}}\right) + 2n\pi \qquad \text{Expression 1}$$

When controlling an optical path difference produced in the delay unit at a position where the output of the delay unit on the variable-wavelength laser beam is the minimum, the method controls the optical path difference according to a phase difference φ between adjacent pulses of the multiplexed optical signal obtained by Expression 2 (where n is an integer, $\lambda_p$ is the wavelength of the optical pulse, $\lambda_{cw}$ is the wavelength of the variable-wavelength laser beam, c is light velocity, and ΔT is the interval between adjacent pulses of the multiplexed optical signal (ΔT=ΔL/c, where ΔL is an optical path difference)):

$$\phi = 2\pi c \times \Delta T \times \left(\frac{1}{\lambda_p} - \frac{1}{\lambda_{cw}}\right) + (2n+1)\pi \qquad \text{Expression 2}$$

When controlling an optical path difference produced in the delay unit at a position where the output of the delay unit on the variable-wavelength laser beam is a specific value between the maximum and the minimum, the method controls the optical path difference according to a phase difference φ between adjacent pulses of the multiplexed optical signal obtained by Expression 3 (where n is an integer, m is a value from −1 to 1, $\lambda_p$ is the wavelength of the optical pulse, $\lambda_{cw}$ is the wavelength of the variable-wavelength laser beam, c is light velocity, and ΔT is the interval between adjacent pulses of the multiplexed optical signal (ΔT=ΔL/c, where ΔL is an optical path difference)):

$$\phi = 2\pi c \times \Delta T \times \left(\frac{1}{\lambda_p} - \frac{1}{\lambda_{cw}}\right) + (2n+m)\pi \qquad \text{Expression 3}$$

Another embodiment of the invention is an optical time division multiplexing device including: a synthesizing unit that synthesizes an optical pulse and a variable-wavelength laser beam; a delay unit that divides an output signal of the synthesizing unit into two optical signals, produces an optical path difference between the two optical signals to create a delay between the two optical signals, and synthesizes the optical signals again to output a multiplexed optical signal; an optical path length varying unit that minutely varies the optical path length of one of the two optical signals of the delay unit; a filtering unit that extracts a signal component of the variable-wavelength laser beam from an output signal of the delay unit; and a phase difference control unit that, when the optical path length of the one optical signal is minutely varied by the optical path length varying unit, stabilizes a phase difference between adjacent pulses of a multiplexed optical signal outputted from the delay unit by operating the optical path length varying unit so as to minimize the variance of output of a signal component of the variable-wavelength laser beam taken out by the filtering unit at a position where the output is a maximum, minimum, or a specific value other than the maximum or minimum.

In the above-described device, when controlling an optical path difference produced in the delay unit at a position where the output of a signal component of the variable-wavelength laser beam is the maximum, the phase control unit controls the optical path difference according to a phase difference φ between adjacent pulses of the multiplexed optical signal obtained by Expression 4 (where n is an integer, $\lambda_p$ is the wavelength of the optical pulse, $\lambda_{cw}$ is the wavelength of the variable-wavelength laser beam, c is light velocity, and ΔT is the interval between adjacent pulses of the multiplexed optical signal (ΔT=ΔL/c, where ΔL is an optical path difference)):

$$\phi = 2\pi c \times \Delta T \times \left( \frac{1}{\lambda_p} - \frac{1}{\lambda_{cw}} \right) + 2n\pi \qquad \text{Expression 4}$$

When controlling an optical path difference produced in the delay unit at a position where the output of a signal component of the variable-wavelength laser beam is the minimum, the phase control unit controls the optical path difference according to a phase difference φ between adjacent pulses of the multiplexed optical signal obtained by Expression 5:

$$\phi = 2\pi c \times \Delta T \times \left( \frac{1}{\lambda_p} - \frac{1}{\lambda_{cw}} \right) + (2n+1)\pi \qquad \text{Expression 5}$$

When controlling an optical path difference produced in the delay unit at a position where the output of a signal component of the variable-wavelength laser beam is the specific value, the phase control unit controls the optical path difference according to a phase difference φ between adjacent pulses of the multiplexed optical signal obtained by Expression 6 (where n is an integer, m is a value from −1 to 1, $\lambda_p$ is the wavelength of the optical pulse, $\lambda_{cw}$ is the wavelength of the variable-wavelength laser beam, c is light velocity, and ΔT is the interval between adjacent pulses of the multiplexed optical signal (ΔT=ΔL/c, where ΔL is an optical path difference)):

$$\phi = 2\pi c \times \Delta T \times \left( \frac{1}{\lambda_p} - \frac{1}{\lambda_{cw}} \right) + (2n+m)\pi \qquad \text{Expression 6}$$

Preferably, the delay unit is a delay interferometer that includes: a beam splitter that divides an output signal of the synthesizing unit into a first divided optical signal and a second divided optical signal, emits the first divided signal along a first optical path, and emits the second divided signal along a second optical path; a first mirror provided in the first optical path that reflects the first divided signal to the beam splitter; and a second mirror provided in the second optical path that reflects the second divided signal to the beam splitter. The beam splitter also synthesizes the first divided signal inputted from the first mirror and the second divided signal inputted from the second mirror, and outputs a multiplexed optical signal.

Still preferably, the optical path length varying unit includes a piezoelectric element that is attached to a back surface of one of the first and the second mirrors and vibrates the relevant mirror at a predetermined frequency in parallel to the first or the second optical path to which the mirror relates. The phase difference control unit includes a detector that extracts a component of the frequency from the signal component of the variable-length laser light taken out by the filtering unit, and a differential amplifier that extracts a difference between output from the detector and an AC voltage to the piezoelectric element, or an addition amplifier that extracts the sum of output from the detector and an AC voltage to the piezoelectric element.

An embodiment of the present invention stabilizes the operation of the delay unit by inputting a signal synthesized from a variable-wavelength laser beam and an optical pulse to the delay unit, and performing feedback control by use of a signal component of a multiplexed optical signal outputted from the delay unit wherein the feedback control is performed to stabilize a phase difference between adjacent pulses of a multiplexed optical signal. Therefore, without the need to use fast electronic circuits, a phase difference between adjacent pulses of a multiplexed optical signal can be controlled and stabilized with a simple construction of an optical time division multiplexing device. Furthermore, the present invention can arbitrarily change a phase difference by changing the wavelength of the variable-wavelength laser beam wherein a phase difference between adjacent pulses of a multiplexed optical signal is stabilized.

DETAILED DESCRIPTION

Figure 1:
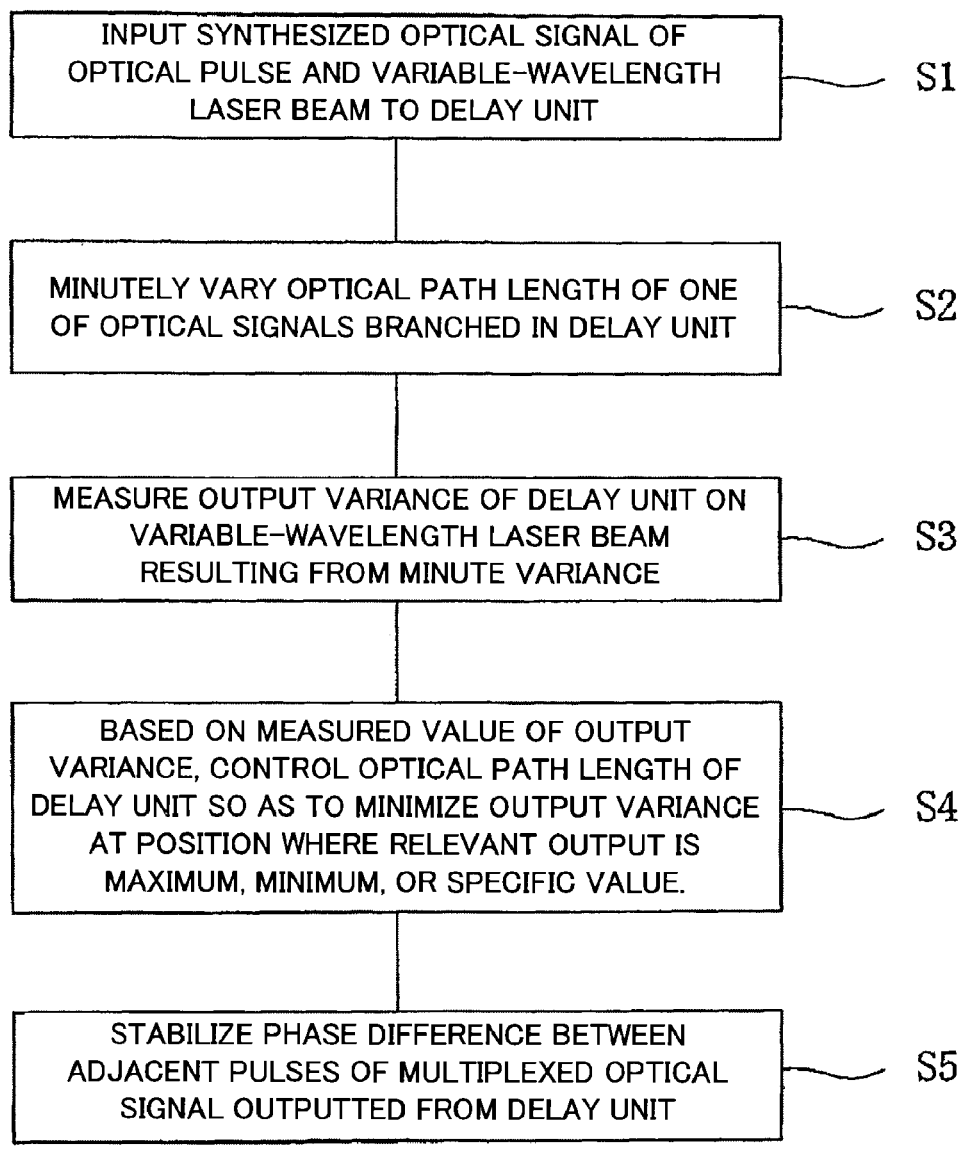
FIG. 1 is a flowchart of an optical time division multiplexing method of one embodiment of the present invention.

Hereinafter, embodiments of the present invention will be described with reference to the accompanying drawings. FIG. 1 is a flowchart of an optical time division multiplexing method of one embodiment of the present invention. As shown in FIG. 1, the present invention inputs a signal into a delay unit, wherein the signal is generated by synthesizing an optical pulse with a variable-wavelength laser beam (S1 of FIG. 1). The delay unit divides the inputted optical signal into two optical signals and produces an optical path difference between the two divided optical signals to create a delay between the two signals. The optical path length of one of the two divided optical signals is minutely varied (S2 of FIG. 1). The delay unit then synthesizes the divided optical signals to generate a multiplexed optical signal.

The method measures the variance of output of the delay unit on a variable-wavelength laser beam that results from the minute variance of the one optical path length (S3 of FIG. 1), and based on a measured value of the output variance, controls the optical path difference produced in the delay unit so as to minimize output variance at a position where the output is a maximum, a minimum, or a specific value other than the maximum or minimum (S4 of FIG. 1). This stabilizes a phase difference between adjacent pulses of the multiplexed optical signal outputted from the delay unit (S5 of FIG. 1).

Provided that the wavelength of the optical pulse is $\lambda_p$, the wavelength of the variable-wavelength laser beam is $\lambda_{cw}$, the interval between adjacent pulses of the multiplexed optical signal is ΔT (ΔT=ΔL/c, where ΔL is an optical path difference and c is light velocity), when controlling an optical path difference produced in the delay unit at a position where the output of the delay unit on the variable-wavelength laser beam is a maximum, the present invention controls the optical path difference to a desired value according to a phase difference φ between adjacent pulses of the multiplexed optical signal obtained by Expression 7 (where n is an integer):

$$\phi = 2\pi c \times \Delta T \times \left(\frac{1}{\lambda_p} - \frac{1}{\lambda_{cw}}\right) + 2n\pi \qquad \text{Expression 7}$$

When controlling an optical path difference produced in the delay unit at a position where the output of the delay unit on the variable-wavelength laser beam is a minimum, the present invention controls the optical path difference to a desired value according to a phase difference φ between adjacent pulses of the multiplexed optical signal obtained by Expression 8 (where n is an integer):

$$\phi = 2\pi c \times \Delta T \times \left(\frac{1}{\lambda_p} - \frac{1}{\lambda_{cw}}\right) + (2n+1)\pi \qquad \text{Expression 8}$$

When controlling an optical path difference produced in the delay unit at a position where the output of the delay unit on the variable-wavelength laser beam is a specific value other than the maximum or minimum, the present invention controls the optical path difference to a desired value according to a phase difference φ between adjacent pulses of the multiplexed optical signal obtained by Expression 9 (where n is an integer, and m is a value from −1 to 1):

$$\phi = 2\pi c \times \Delta T \times \left(\frac{1}{\lambda_p} - \frac{1}{\lambda_{cw}}\right) + (2n+m)\pi \qquad \text{Expression 9}$$

Figure 2:
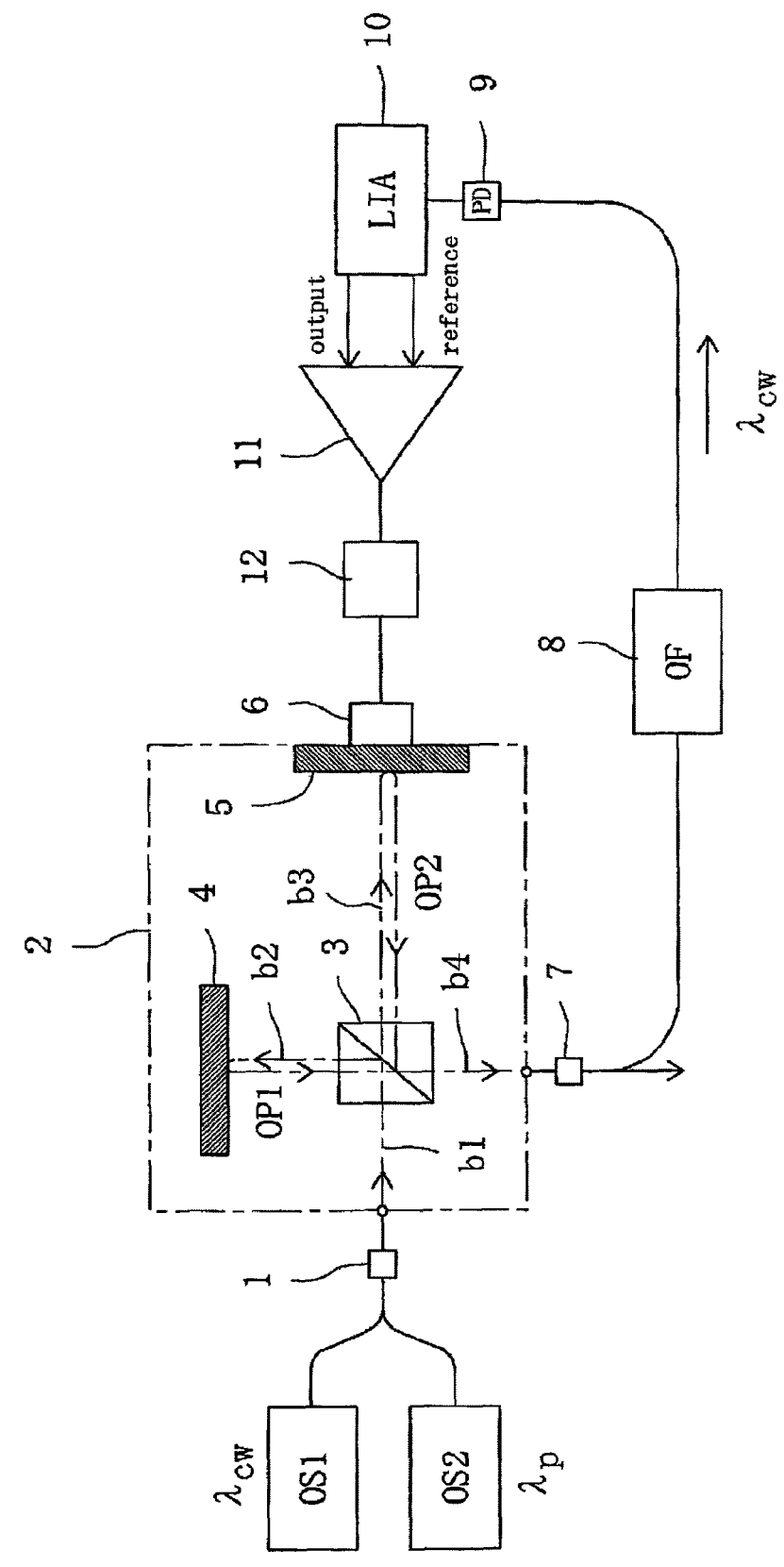
FIG. 2 is a block diagram showing the construction of an optical time division multiplexing device of one embodiment of the present invention.

FIG. 2 is a block diagram showing the construction of an optical time division multiplexing device of one embodiment of the present invention. As shown in FIG. 2, the embodiment of the present invention includes a first optical coupler 1 that synthesizes a variable-wavelength laser beam (wavelength $\lambda_{cw}$) outputted from a first light source OS1 and an optical pulse (wavelength $\lambda_p$) outputted from a second light source OS2. A delay interferometer 2 divides an output signal of the first optical coupler 1 into two optical signals, produces an optical path difference between the two optical signals to create a delay between the two signals, and synthesizes the optical signals to generate a multiplexed optical signal. Although, in this embodiment, any of the optical paths connecting optical elements to each other may be formed from an optical fiber, the construction of an optical path is not limited to optical fiber. Moreover, instead of the delay interferometer, any delay unit having functions equivalent to the delay interferometer may be used.

The delay interferometer 2 includes: a beam splitter 3 that divides an output signal b1 of the first optical coupler 1 into a first divided optical signal b2 and a second divided optical signal b3, emits the first divided signal b2 along the first optical path OP1, and emits the second divided signal b3 along the second optical path OP2; a first mirror 4 provided in the first optical path OP1 that reflects the first divided signal b2 back to the beam splitter 3; and a second mirror 5 provided in the second optical path OP2 that reflects the second divided signal b3 back to the beam splitter 3. The beam splitter 3 synthesizes the first divided optical signal b2 reflected from the first mirror 4 and the second branched optical signal b3 reflected from the second mirror 5, and outputs a multiplexed optical signal b4.

A piezoelectric element 6, attached to the back surface of the second mirror 5, minutely vibrates the second mirror 5 at a predetermined frequency in parallel to the second optical path OP2 to which it relates. The optical path length of the second optical path OP2 varies minutely in response to the vibration of the second mirror 5.

Furthermore, a second optical coupler 7 is provided at the output side of the delay interferometer 2, and one optical signal branched by the second optical coupler 7 is inputted to an optical filter (OF) 8. The OF passes only light having a wavelength of $\lambda_{cw}$, thereby only signal components of a variable-wavelength laser beam of output signals of the delay interferometer 2 are outputted from the OF 8.

The output of OF 8 is inputted to a lock-in amplifier (LIA) 10 via a photodiode 9. The lock-in amplifier 10 extracts components of frequencies resulting from the variance of optical path length of the second optical path OP2 from signal components of the variable-wavelength laser beam.

A differential amplifier 11 is connected to the output side of the lock-in amplifier 10. The differential amplifier 11 extracts the difference between output from the lock-in amplifier 10 and an AC voltage to the piezoelectric element 6.

A piezoelectric element driving unit 12 is connected to the output side of the differential amplifier 11. The piezoelectric element driving unit 12, according to an output signal of the differential amplifier 11, vibrates the piezoelectric element 6 so that the variance of the output is minimal, at a position where the output of signal components of variable-wavelength laser beam is a maximum, minimum, or a specific value other than the maximum or minimum. Thereby, a phase difference between adjacent pulses of a multiplexed optical signal outputted from the delay interferometer 2 is stabilized. Although, in this embodiment, a difference between the output of the lock-in amplifier 10 and the AC voltage to the piezoelectric element 6 is extracted by the differential amplifier 11, an addition amplifier may be used instead of the differential amplifier to extract the sum of output from the lock-in amplifier 10 and the AC signal to the piezoelectric element 6 for control.

Thus, according to an embodiment of the present invention, by performing feedback control wherein the lock-in amplifier 10 uses signal components of a variable-wavelength laser beam, operating points of the delay interferometer 2 are controlled and stabilized. As such, a phase difference between adjacent pulses of a multiplexed optical signal is stabilized.

Figure 3:
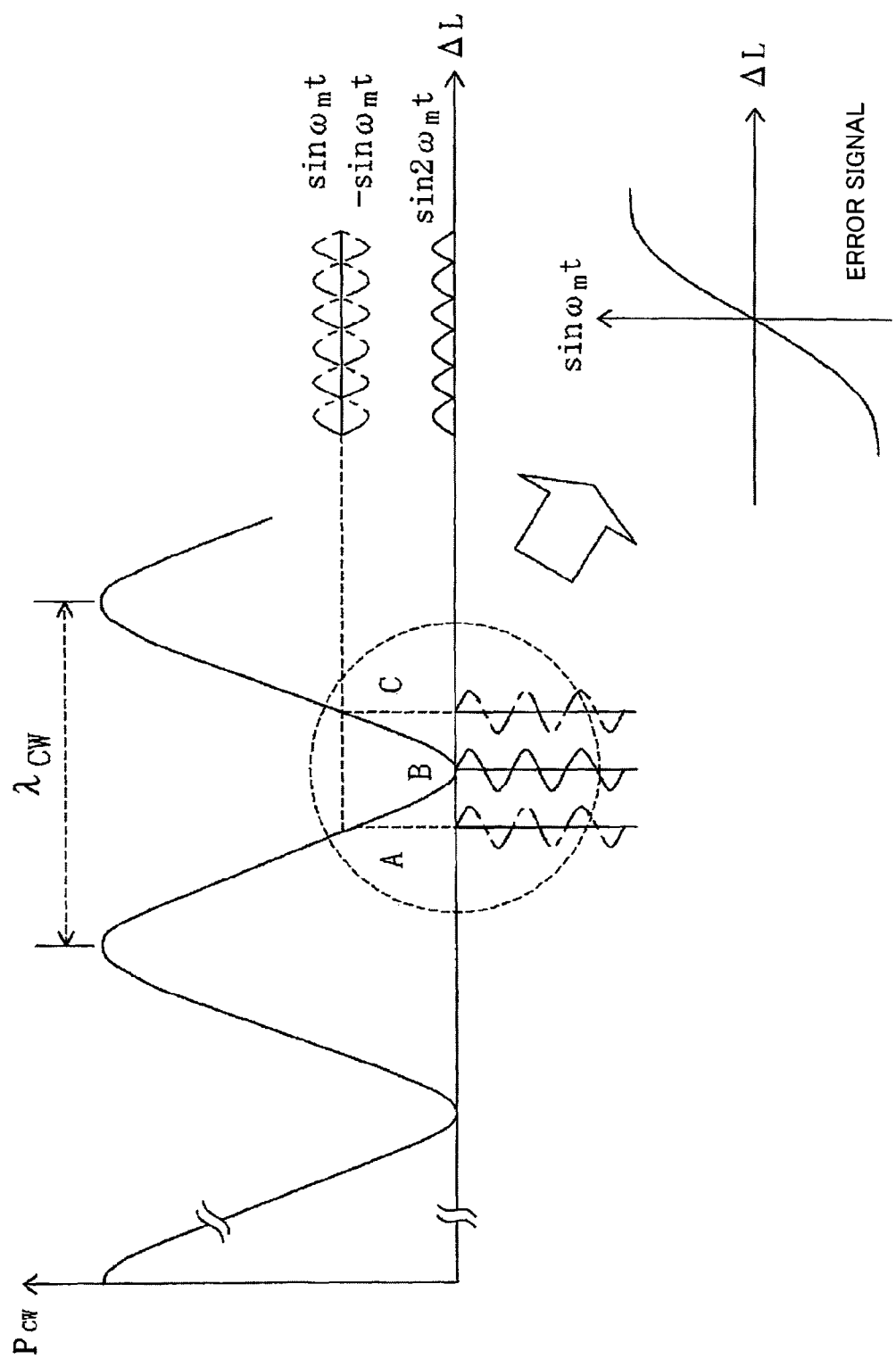
FIG. 3 is a drawing for explaining feedback control operation by a lock-in amplifier.

The following describes feedback control operation by the lock-in amplifier 10 with reference to FIG. 3. In FIG. 3, a reference point of a phase difference is set at a point where the output of a signal component of a variable-wavelength laser beam is a minimum, that is, a point B in which the signal component of the variable-wavelength laser beam is perfectly reversed in phase. When the piezoelectric element 6 vibrates at a frequency $\omega_m$, the signal component of the variable-wavelength laser beam is modulated. In this case, at a point C that has a longer optical path difference than the point B, a sinusoidal signal having the same frequency as the frequency $\omega_m$ of the piezoelectric element 6 is outputted from the lock-in amplifier 10. On the other hand, at a point A that has a shorter optical path difference than the point B, the sign of vibration is reversed. At the point B, no more than double frequency component $2\omega_m$ is outputted. Therefore, an output signal of the lock-in amplifier 10 can be used as an error signal to the piezoelectric element 6. Feedback control is performed so that, at the point C, ΔL moves in a direction in which $\omega_m$ becomes smaller, and at the point A, ΔL moves in a direction in which $\omega_m$ becomes greater. As such, control is performed so that the $\omega_m$ component is always zero.

The optical time division multiplexing device of the present invention stabilizes a phase difference between adjacent pulses of a multiplexed optical signal. Provided that the wavelength of the optical pulse is $\lambda_p$, the wavelength of the variable-wavelength laser beam is $\lambda_{cw}$, the interval between adjacent pulses of the multiplexed optical signal is $\Delta T$ ($\Delta T = \Delta L/c$, where $\Delta L$ is an optical path difference and c is light velocity), when controlling an optical path difference produced in the delay interferometer 2 at a position where the output of the delay interferometer 2 on the variable-wavelength laser beam is a maximum, the optical time division multiplexing device controls the optical path difference according to a phase difference $\phi$ between adjacent pulses of the multiplexed optical signal obtained by Expression 10 (where n is an integer):

$$\phi = 2\pi c \times \Delta T \times \left(\frac{1}{\lambda_p} - \frac{1}{\lambda_{cw}}\right) + 2n\pi \qquad \text{Expression 10}$$

When controlling an optical path difference produced in the delay interferometer 2 at a position where the output of the delay interferometer 2 on the variable-wavelength laser beam is a minimum, the optical time division multiplexing device controls the optical path difference to a desired value according to a phase difference $\phi$ between adjacent pulses of the multiplexed optical signal obtained by Expression 11 (where n is an integer):

$$\phi = 2\pi c \times \Delta T \times \left(\frac{1}{\lambda_p} - \frac{1}{\lambda_{cw}}\right) + (2n+1)\pi \qquad \text{Expression 11}$$

When controlling an optical path difference produced in the delay interferometer 2 at a position where the output of the delay interferometer 2 on the variable-wavelength laser beam is a specific value other than the maximum or minimum, the present invention controls the optical path difference to a desired value according to a phase difference $\phi$ between adjacent pulses of the multiplexed optical signal obtained by Expression 12 (where n is an integer, and m is a value from $-1$ to 1):

$$\phi = 2\pi c \times \Delta T \times \left(\frac{1}{\lambda_p} - \frac{1}{\lambda_{cw}}\right) + (2n+m)\pi \qquad \text{Expression 12}$$

What is claimed is:

1. A method for stabilizing a phase difference between adjacent pulses of a multiplexed optical signal, the method comprising:
    dividing an input signal into a first optical signal and a second optical signal at a delay unit;
    producing an optical path difference to create a delay between the first and second optical signals, wherein the optical path difference is a difference between a first optical path for the first optical signal and a second optical path for the second optical signal;
    varying a first optical path length of the first optical signal;
    synthesizing the first and second optical signals to generate a multiplexed optical signal;
    outputting the multiplexed optical signal from the delay unit;
    measuring an output change of the delay unit that results from the variance of the first optical path length, wherein the measuring the output change of the delay unit comprises:
        extracting, via a lock-in amplifier, a component of a frequency from a signal component of the multiplexed optical signal; and
        comparing, via a second amplifier, an output of the lock-in amplifier and an AC voltage; and
    controlling the first optical path length based on an output of the second amplifier so as to minimize the output change of the delay unit.

2. The method of claim 1, further comprising inputting the input signal into the delay unit, wherein the input signal is generated by synthesizing an optical pulse with a variable-wavelength laser beam, wherein a variable-wavelength laser beam wavelength is different than an optical pulse wavelength.

3. The method of claim 1, wherein the output change of the delay unit corresponds to a change in a frequency component of the multiplexed optical signal.

4. An optical time division multiplexing device comprising: a delay unit configured to divide an input signal into a first optical signal and a second optical signal, further configured to produce an optical path difference between the first and second optical signals to create a delay between the first and second, optical signals, wherein the optical path difference is a difference between a first optical path for the first optical signal and a second optical path for the second optical signal, and further configured to synthesize the first and second optical signals to output a multiplexed optical signal;
    an optical path length varying unit that varies a first optical path length of the first optical signal; and
    a phase difference control unit configured to measure an output change of the delay unit that results from the variance of the first optical path length, and further configured to control the optical path length varying unit to minimize the output change of the delay unit, wherein the phase difference control unit comprises:
        a lock-in amplifier configured to extract a component of a frequency from the signal component of the multiplexed output signal extracted by the filtering unit; and
        a second amplifier configured to compare an output of the lock-in amplifier and an AC voltage to the optical path length varying unit.

5. The optical time division multiplexing device of claim 4, wherein the delay unit comprises a delay interferometer, and wherein the delay interferometer comprises:
    a beam splitter configured to divide the input signal into the first optical signal and the second optical signal, further configured to emit the first optical signal along the first optical path and emit the second optical signal along the second optical path;
    a first mirror in the first optical path configured to reflect the first optical signal back to the beam splitter; and
    a second mirror in the second optical path configured to reflect the second optical signal back to the beam splitter, and
    wherein the beam splitter is further configured to synthesize the first optical signal inputted from the first mirror and the second optical signal inputted from the second mirror, and further configured to output the multiplexed optical signal.

6. The optical time division multiplexing device of claim 5, wherein the second amplifier comprises-a differential amplifier configured to determine a difference between the output of the detector and the AC voltage to the optical path length varying unit.

7. The optical time division multiplexing device of claim 6, wherein the predetermined frequency is determined based on the difference between the output of the detector and the AC voltage to the piezoelectric element.

8. The device of claim 4, further comprising a filtering unit configured to extract a signal component from the multiplexed optical output signal of the delay unit.

9. The optical time division multiplexing device of claim 8, wherein the optical path length varying unit comprises a piezoelectric element attached to a back surface of one of the first or the second mirror, and wherein the piezoelectric element is configured to vibrate the first or the second mirror at a predetermined frequency.

10. The optical time division multiplexing device of claim 9, wherein second amplifier comprises
an addition amplifier configured to determine a sum of the output from the detector and the AC voltage to the optical path length varying unit.

11. The optical time division multiplexing device of claim 4, further comprising a synthesizing unit configured to synthesize an optical pulse and a variable-wavelength laser beam to form the input signal.

\* \* \* \* \*

UNITED STATES PATENT AND TRADEMARK OFFICE
CERTIFICATE OF CORRECTION

PATENT NO. : 8,103,170 B2
APPLICATION NO. : 12/196871
DATED : January 24, 2012
INVENTOR(S) : Toda Page 1 of 1

It is certified that error appears in the above-identified patent and that said Letters Patent is hereby corrected as shown below:

On the Title Page, in Item (57), under "ABSTRACT", in Column 2, Line 15, delete "(5)" and insert -- (S5) --, therefor.

In the Specifications:

In Column 4, Line 52, delete "and" and insert -- and, --, therefor.

In the Claims:

In Column 8, Line 28, in Claim 4, delete "second," and insert -- second --, therefor.

In Column 8, Line 67, in Claim 6, delete "comprises-a" and insert -- comprises a --, therefor.

In Column 9, Line 8, in Claim 8, delete "device" and insert -- optical time division multiplexing device --, therefor.

Signed and Sealed this
Twentieth Day of August, 2013

Teresa Stanek Rea
*Acting Director of the United States Patent and Trademark Office*